US012231860B2

(12) United States Patent
Holm Hansen et al.

(10) Patent No.: US 12,231,860 B2
(45) Date of Patent: Feb. 18, 2025

(54) MEASUREMENT-BASED LOUDSPEAKER EXCURSION LIMITING

(71) Applicant: Infineon Technologies Austria AG, Villach (AT)

(72) Inventors: Thomas Holm Hansen, Værløse (DK); Pawan Garg, Torrance, CA (US); Jun Honda, El Segundo, CA (US); Niels Petersen, Frederiksberg (DK)

(73) Assignee: Infineon Technologies Austria AG, Villach (AT)

(*) Notice: Subject to any disclaimer, the term of this patent is extended or adjusted under 35 U.S.C. 154(b) by 155 days.

(21) Appl. No.: 17/735,218

(22) Filed: May 3, 2022

(65) Prior Publication Data

US 2023/0362541 A1 Nov. 9, 2023

(51) Int. Cl.
*H04R 3/00* (2006.01)
*H04R 3/04* (2006.01)
*H04R 29/00* (2006.01)

(52) U.S. Cl.
CPC ............... *H04R 3/007* (2013.01); *H04R 3/04* (2013.01); *H04R 29/001* (2013.01); *H04R 2430/01* (2013.01)

(58) Field of Classification Search
CPC ........ H04R 3/007; H04R 3/04; H04R 29/001; H04R 2430/01
USPC ................................ 381/59, 94.8, 104, 108
See application file for complete search history.

(56) References Cited

U.S. PATENT DOCUMENTS

2004/0125003 A1* 7/2004 Craven ............... H03M 7/3046 341/76
2011/0228945 A1* 9/2011 Mihelich .............. H04R 29/001 381/59
2014/0126730 A1* 5/2014 Crawley .............. H04R 29/001 381/59
2016/0173983 A1* 6/2016 Berthelsen ............. H03G 9/025 381/55
2016/0373871 A1 12/2016 Ronig et al.
2017/0347188 A1 11/2017 Thyssen
2021/0136491 A1 5/2021 Hodges et al.
2022/0240012 A1* 7/2022 MacLean ................ H04R 5/04

FOREIGN PATENT DOCUMENTS

DE 102014115719 A1 5/2015
WO 2014045123 A2 3/2014

* cited by examiner

*Primary Examiner* — William A Jerez Lora
(74) *Attorney, Agent, or Firm* — Murphy, Bilak & Homiller, PLLC

(57) ABSTRACT

A method for designing a loudspeaker excursion estimator comprises measuring an excursion-related parameter for a loudspeaker, for each of a plurality of loudspeaker input signal levels and each of a plurality of loudspeaker input signal frequencies. The method further comprises, for each of the loudspeaker input signal frequencies and based on the measured excursion-related parameters, identifying a respective loudspeaker input signal level corresponding to a target maximum excursion-related parameter value. The method further comprises determining a filter response, based on the identified loudspeaker input signal levels and their respective loudspeaker input signal frequencies, and implementing a filter, based on the calculated filter response, for generating an excursion estimation based on loudspeaker input signal levels.

19 Claims, 11 Drawing Sheets

MEASUREMENT-BASED LOUDSPEAKER EXCURSION LIMITING

TECHNICAL FIELD

The present disclosure is generally related to loudspeakers and is more particularly related to techniques for limiting speaker excursion in loudspeakers.

BACKGROUND

An electrodynamic loudspeaker comprises a cone or other diaphragm attached to a voice coil. The voice coil is moved by an electromagnetic field, to vibrate the diaphragm and produce sound. The frequency content of the diaphragm movements translates directly into the frequency content of the sound, while the range of motion translates into the sound's amplitude. For a given frequency, the farther the diaphragm moves, the louder the sound. However, the relationship between the distance traveled by the diaphragm, called "excursion," and the resulting loudness will vary with frequency.

Loudspeakers are susceptible to damage resulting from excessive excursions of the diaphragm. The damage might result from the diaphragm striking a part of the loudspeaker housing or enclosure, often referred to as the loudspeaker cabinet, or simply from excessive stresses on the diaphragm itself, resulting in tears, punctures, or distortions of the diaphragm material. Even absent sustained damage to the speaker, excessive excursions can cause non-linear operation of the speaker, creating distortion in the produced sound, relative to the loudspeaker's input signal.

As audio products become smaller, the loudspeakers are being pushed harder than ever to generate "loud" sound, with high bass levels. A powerful amplifier can readily drive these louder speakers to their limits, such that the voice coil hits part of the enclosure or such that the speaker enters a highly non-linear operating region, introducing distortion and/or damaging the diaphragm or spider (a suspension component surrounding the voice coil and providing the restoring force to return the voice coil and cone to a neutral position after moving). To avoid this, various speaker protection techniques have been developed.

Existing speaker protection techniques often rely on design margins, to ensure that the speaker excursion stays well within "safe" limits, or models of the loudspeaker behavior, with either or both being used to put limits on the input signal driving the speaker. However, including significant design margins to avoid operation of the speaker and the amplifier system in an "unsafe" operating area leads to underutilization of the speaker. Further, the model-based approach typically relies on complex and tedious speaker modeling and/or characterization measurements.

Both speaker modeling and characterization generally require significant expertise and expensive equipment, to achieve reliable outcomes. Typical characterization measurements include Thiele-Small speaker parameter measurements, speaker non-linearity measurements such as Bl versus excursion, L vs excursion, Cms vs excursion, etc. The extracted/measured parameters are then used in filter structures that can be computationally demanding and complex, to mimic the loudspeaker's performance and estimate the loudspeaker excursion. All of these complexities can lead to expensive and lengthy design cycles, and long times-to-market.

SUMMARY

Embodiments of the presently disclosed techniques, circuits, and systems address these problems. An example method for designing a loudspeaker excursion estimator, according to some of these embodiments, comprises the step of measuring an excursion-related parameter for a loudspeaker, for each of a plurality of loudspeaker input signal levels and each of a plurality of loudspeaker input signal frequencies. The method further comprises identifying, for each of the plurality of loudspeaker input signal frequencies and based on the measured excursion-related parameters, a respective loudspeaker input signal level corresponding to the loudspeaker input signal frequency and corresponding to a target maximum excursion-related parameter value. The method still further comprises determining a filter response, based on the identified loudspeaker input signal levels and their respective loudspeaker input signal frequencies, and implementing a filter, based on the determined filter response, for generating an excursion estimate based on loudspeaker input signal levels.

Another example method is implemented by a circuit coupled to or in a loudspeaker system and comprises receiving an audio signal coupled from an audio signal path coupled to a loudspeaker, filtering the audio signal using an excursion estimation filter, to obtain an excursion estimation signal, and detecting that the excursion estimation signal exceeds a predetermined threshold. The method further comprises activating or modifying gain control or slew limiting in the audio signal path coupled to the loudspeaker, in response to this detecting.

An example loudspeaker system, according to several of the embodiments described herein, comprises a loudspeaker, having an electrical input and an audio signal path coupled to the electrical input, the audio signal path comprising gain control circuitry or slew limiting circuitry, or both. The loudspeaker system further comprises excursion estimation filter circuitry having an input coupled to the audio signal path, detector circuitry coupled to an output of the excursion estimation filter circuitry and configured to detect that an output signal of the excursion estimation filter circuitry exceeds a predetermined threshold, and control circuitry configured to activate or modify performance of the gain control circuitry or slew limiting circuitry or both, in response to an output from the detector circuitry.

The above embodiments and several variants thereof are illustrated in the attached figures and explained in further detail in the detailed description that follows.

DETAILED DESCRIPTION

For the purposes of this document, the term "excursion" (or "speaker excursion") may be regarded as interchangeable with "displacement," with these terms referring to the distance of lateral motion of the speaker diaphragm. In this context, "displacement" should be understood as a distance measurement, and should not be confused with "volume displacement," which refers to the volume of air that is displaced by the movement of the diaphragm. (Assuming linear motion, the volume displacement is at least roughly equal to the lateral displacement of the diaphragm times the radiating area of the diaphragm.)

Likewise, the terms "loudspeaker" and "speaker" are used interchangeably here. In general usage (outside the present document), the terms "speaker" and "loudspeaker" may refer to a multi-transducer system, e.g., comprising a "tweeter," "woofer," and "mid-range driver," but these terms are used herein to refer to individual transducers that convert electrical signals to sound waves. The term "driver" is often used to refer to what are referred to here as simply a "speaker" or "loudspeaker"; hence, the term "driver" may be considered synonymous with "speaker" or "loudspeaker" as used herein.

Figure 1:
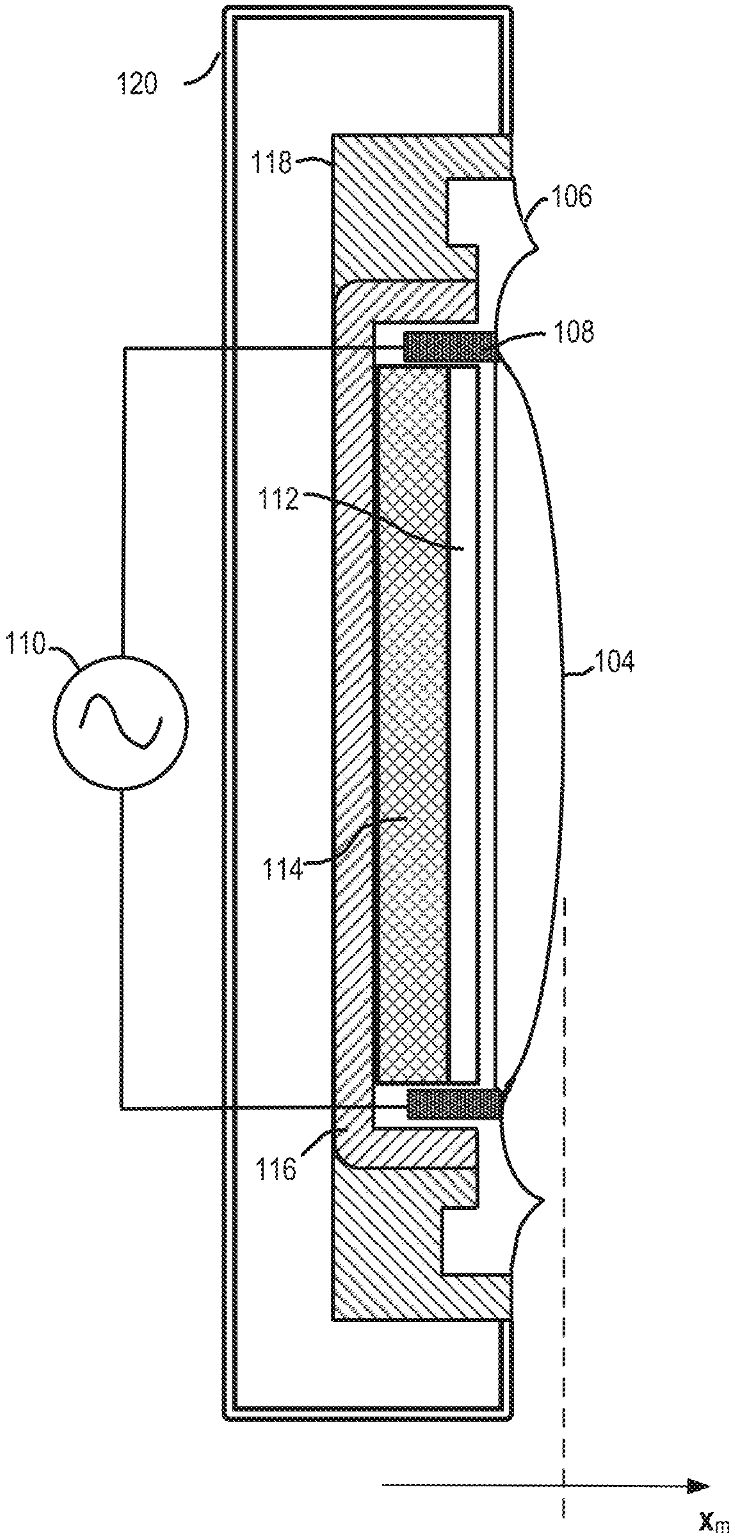
FIG. 1 illustrates an example loudspeaker.

FIG. 1 is a cross-sectional side view of a speaker of a type commonly used for small devices. Such a loudspeaker may also be referred to as a driver. The speaker is in a frame 118, which holds all of the components of the speaker, and features a cone 104 held in place by a surrounding peripheral suspension 106, which is attached to the frame. The cone may be rectangular or circular with a concentric suspension of more or less the same shape, in various implementations, or may assume a variety of other shapes.

The cone, or, more generally, diaphragm 104 is attached to a floating voice coil 108 which moves the cone in and out or left and right as shown in the diagram. This movement of the diaphragm 104 generates a compression wave through the air in front of the diaphragm 104, thereby producing an acoustic signal, i.e., sound.

An electrical audio signal 110 is produced by an amplifier (not shown) and applied to the voice coil 108, which is an electromagnet. The magnetic field so generated interacts with the magnetic field produced by magnet 114, resulting in a force that moves the diaphragm 104. Additional ferric elements 112, 116 may be included to enhance the interaction between the voice coil 108 and the permanent magnet 114.

The loudspeaker thus acts as a transducer, converting the electrical audio signal to an acoustic wave. The response of the transducer, i.e., the relationship between input signal and the resulting acoustic signal, as a function of frequency, depends on a variety of design and manufacturing characteristics of the speaker. These include the materials used for the components, frame, and housing of the speaker, as well as their shapes and dimensions. The housing is typically referred to as the loudspeaker cabinet or loudspeaker enclosure, and is shown as speaker cabinet 120 in FIG. 1. The size, shape, and composition of the speaker cabinet 120 affect the performance of the loudspeaker system—the techniques described herein may be carried out when the loudspeaker is in its proper position within the speaker cabinet 120, so that the acoustic effects of the speaker cabinet 120 are fully accounted for.

Generally speaking, the input signal 110 may be represented as a voltage v(t), which produces a current i(t) through the voice coil. The current i(t) is transduced to a mechanical force $F(t)=B1*i(t)$ by the magnet 114 and the voice coil 108, possibly with the additional enhancements produced by ferric elements 112, 116. The excursion x of the cone is related to this mechanical force, but this relationship is generally non-linear, except perhaps near the center of the diaphragm 104. The excursion is influenced by the masses of the diaphragm 104 and voice coil 108, as well as by damping caused by suspension 106. Various frictions also affect the excursion. Movement of the diaphragm 104 away from the permanent magnet 114 reduces the magnetic field interaction, introducing further non-linearities into the system.

Consequently, the relationship between the input voltage/current and the diaphragm's excursion is non-linear and challenging to model.

To limit the excursion of the speaker diaphragm, an estimator circuit may be used to estimate or predict the speaker's excursion, based on an input signal to the speaker system. The input signal can then be modified, using a filter based on this estimate, to limit the electrical voltage/current applied to the speaker and limit the diaphragm's excursion.

Figure 2:
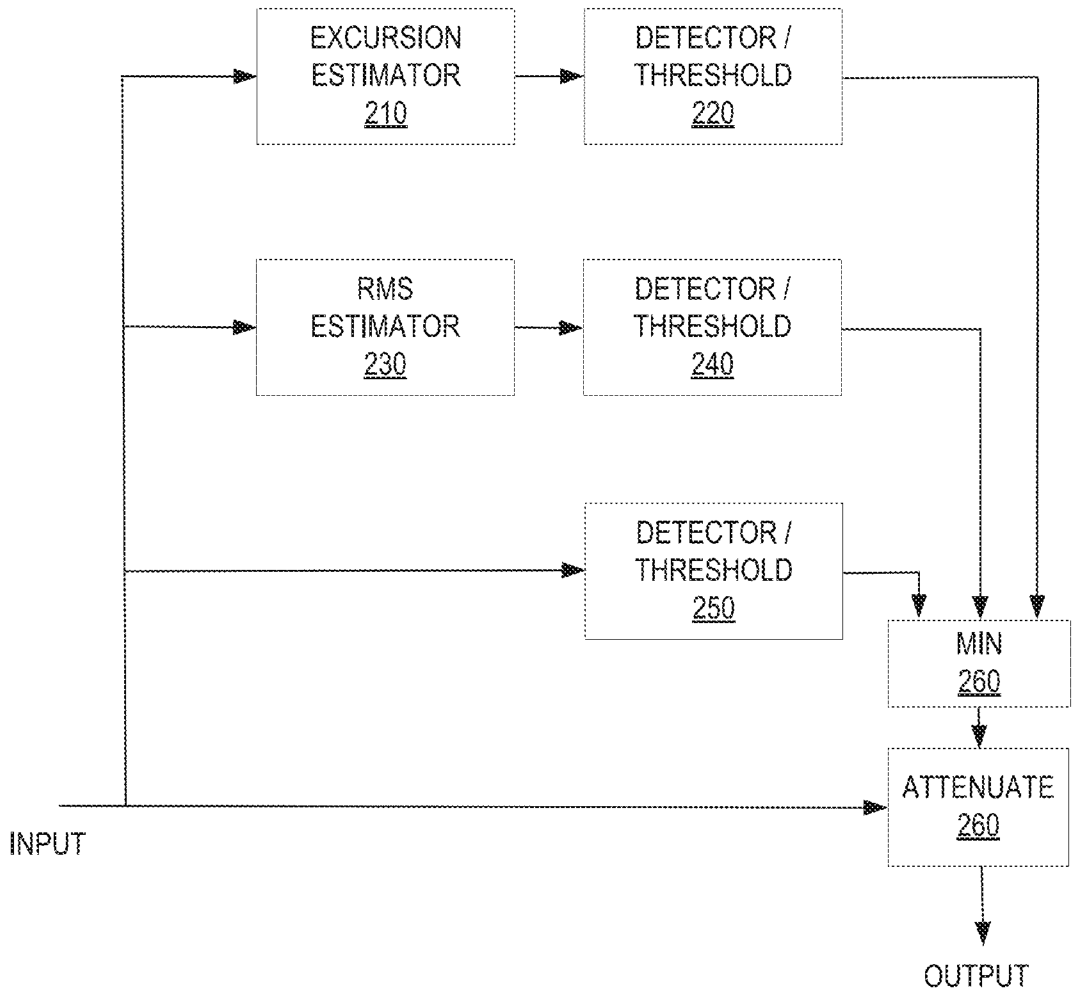
FIG. 2 is a block diagram illustrating an example excursion limiting circuit.

FIG. 2 is a block diagram illustrating components of an example estimation and limiting circuit, according to some embodiments of the techniques described herein. The input is an electrical audio signal to be filtered before application to a loudspeaker-thus, the output of the circuitry shown in FIG. 2 is the signal applied to the loudspeaker itself. In the figure can be seen a root-mean-square (RMS) estimator 230, which generates a value proportional to the square root of arithmetic mean of the square of the input signal, over a predetermined interval, i.e., a value representative of the short-term average power of the input signal. The output of the RMS estimator 230 is compared to one or more thresholds, in detector/threshold block 240, to determine whether the RMS amplitude is such that the input signal should be limited, i.e., attenuated, and, in some embodiments, to what degree, as well as to determine whether previously imposed attenuation can be relaxed, or eliminated. In parallel, a peak detector/threshold block 250 compares the input signal directly to one or more thresholds, to detect instantaneous or very short-term peaks that may also trigger attenuation of the input signal and subsequent relaxation. Finally, at the top of the illustrated circuit, is an excursion estimator 210, which estimates a speaker excursion as a function of the input signal. The estimated excursion is similarly compared to one or more thresholds, in detector/threshold block 220, to determine whether (and/or to what extent) the input signal should be attenuated or whether previous attenuation can be relaxed or eliminated.

The minimization block 260 evaluates the inputs from detector/threshold blocks 220, 240, and 250 to determine to what extent the input signal should be attenuated, such that the attenuation addresses any of the exceeded thresholds. These inputs may comprise binary indications of whether attenuation is necessary, based on the respective evaluations of the signals. These inputs may also comprise indications of how much attenuation is needed, to address excessive excursion, excessive RMS level, or excessive peak level, respectively. It will be appreciated that attenuation applied to address any one of these problems will reduce any of the others, so the evaluation performed by minimization block 260 may comprise selecting the smallest degree of attenuation that will address all three evaluation paths. In some cases, one or more of the inputs may comprise an indication of a slew rate of the evaluated signal, and/or an indication of an attack rate that is needed for the attenuation. Based on these inputs, minimization block 260 controls attenuation block 260, which may comprise conventional gain control and slew-limiter circuits to implement the attenuation of the input signal, responsive to the estimates.

While FIG. 2 illustrates an example in which gain control and slew limiting is based on three distinct thresholds, other implementations might use only one or two of these paths, or might use additional paths. Likewise, while FIG. 2 shows an example in which gain control and slew limiting is performed in common, based on inputs from all three paths, other implementations might include separate gain control and/or slew-rate limiting in each of multiple paths, where, for example, the gain control and/or slew-rate limiting in a given path is based on the threshold detector in that path.

Furthermore, while FIG. 2 illustrates an excursion estimator, which can produce a value representative of the estimated diaphragm excursion, the techniques described herein may more generally involve the estimation of any of a variety of excursion-related parameters. An estimate of the physical excursion is an excursion-related parameter, of course. However, another example might be an estimate of speaker distortion, based on the input signal level.

Conventionally, estimating excursion or other excursion-related parameters from an input electrical signal requires extensive modeling or extensive characterization by measurement of the loudspeaker, or a combination of both. According to the techniques described herein, however, a limited number of simple speaker characterization measurements can be used to extract an excursion estimation filter, or function, without any modeling or parameter extraction. As detailed below, various implementations of these techniques measure the excursion (or other excursion-related parameter) at each of several frequencies, at each of several input signal levels. Based on these measurements, the maximum input signal amplitude that can be applied to the speaker without exceeding a targeted maximum excursion or distortion can be obtained, as a function of frequency. These maximum input signal amplitudes can then be used to design a simple estimator filter, e.g., for implementation in the excursion estimator 210 shown in FIG. 2, which can be followed by gain-control and slew-limiter circuit blocks to effectively limit the excursion of the speaker. The limiting threshold used to activate the attenuation introduced by the gain-control and slew-limiter circuit blocks may also be selected based on the obtained measurements.

Figure 3:
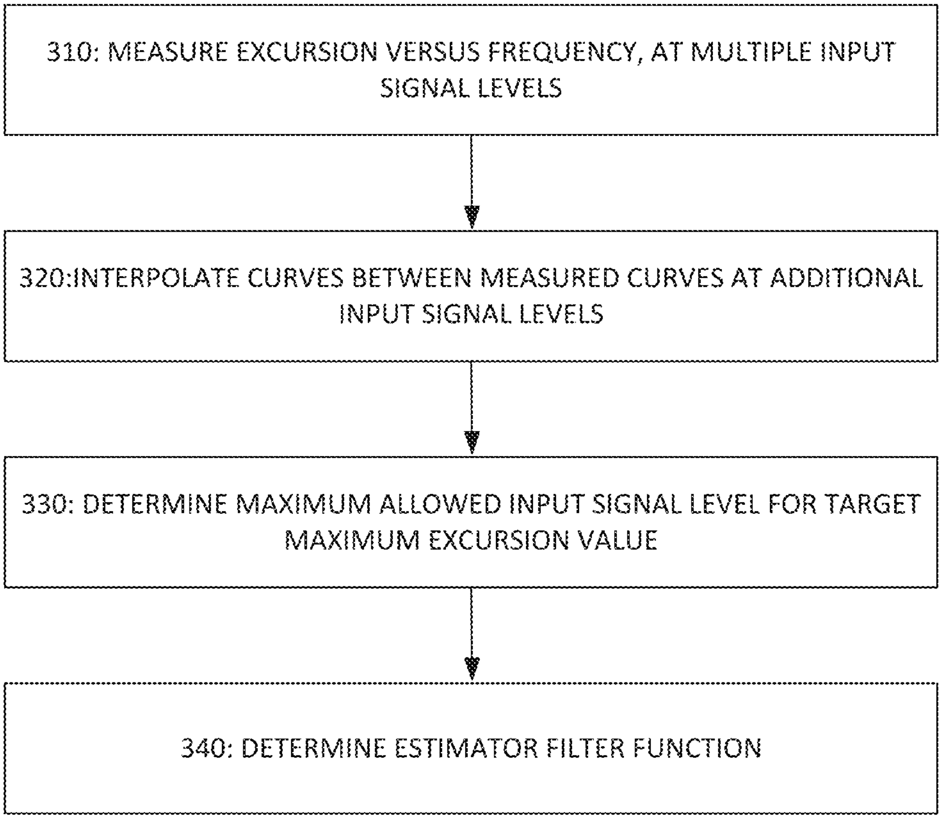
FIG. 3 is a process flow diagram illustrating an example method for determining an estimator filter function.

FIG. 3 is a process flow diagram illustrating an example method for designing the estimator transfer function, which also may be referred to as an estimator filter. As shown at block 310, the method includes the step of measuring excursion versus frequency, at each of several input signal levels. Measuring the excursion versus frequency can be performed at each of several discrete frequencies spanning the audible range, for example. The input signal level can be a voltage level or a current level, in various implementations. Alternatively, another excursion-related parameter, such as audio distortion level, can be measured versus frequency, at each of several input signal levels.

Figure 4:
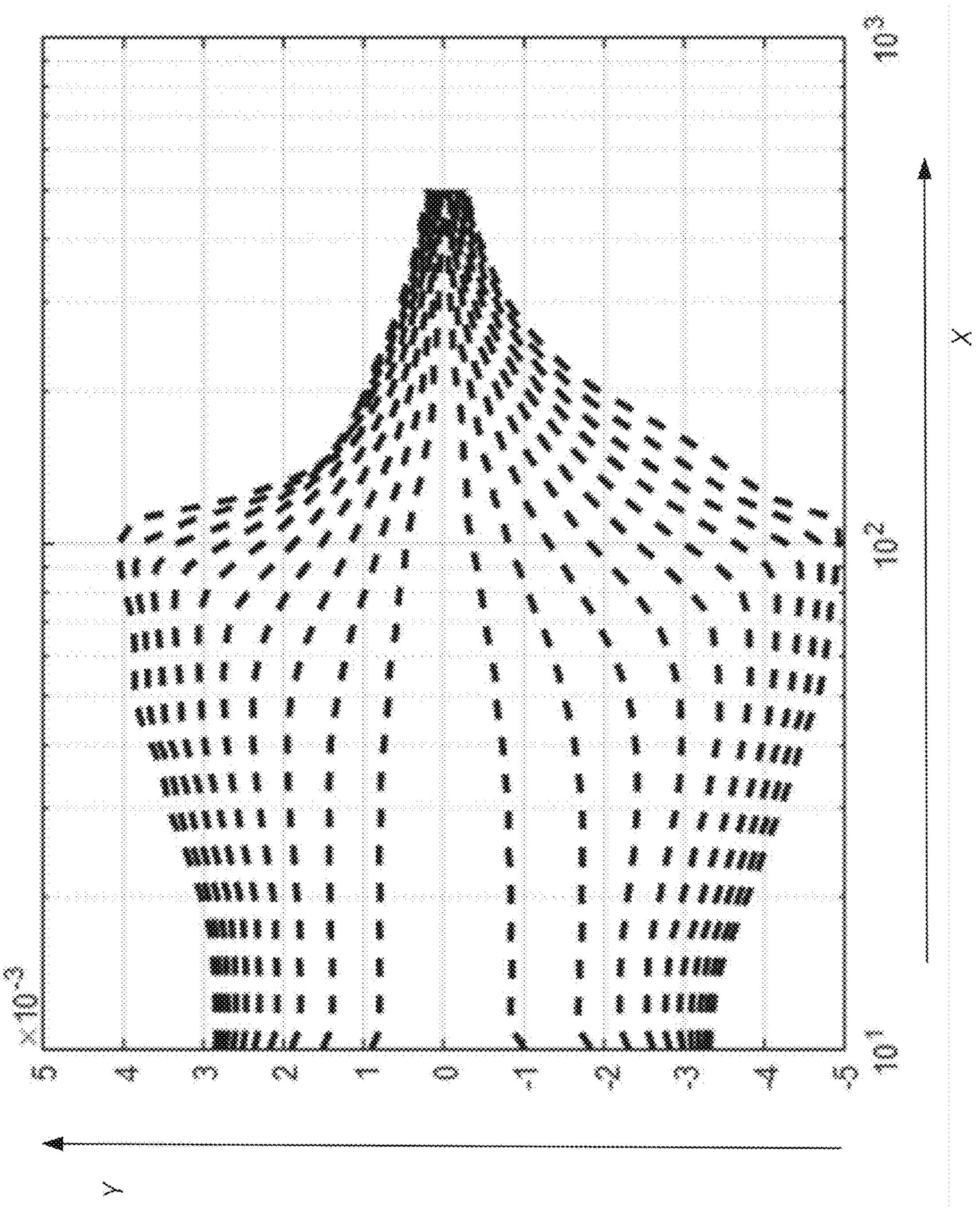
FIG. 4 shows an example of excursion-versus-frequency measurements at each of several input levels.

FIG. 4 illustrates an example of excursion-versus-frequency measurements at each of several input voltage levels. The x-axis in FIG. 4 is frequency, in Hz, while the y-axis is excursion, in meters.

Figure 5:
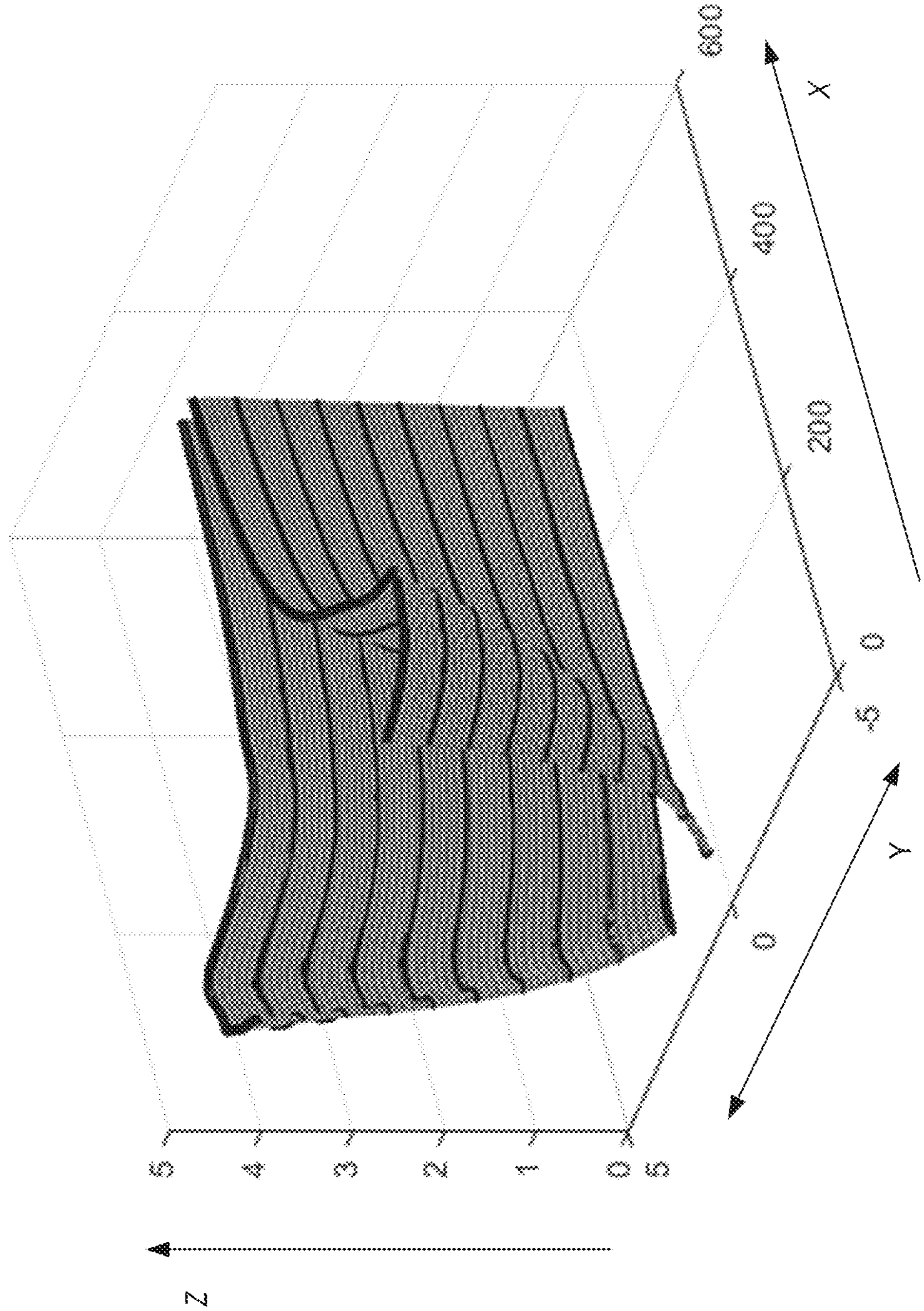
FIG. 5 illustrates an example of interpolated excursion-versus-frequency curves.

Returning to FIG. 3, the illustrated method further comprises, as shown at block 320, a step of interpolating curves between the measured curves to obtain a characterization of excursion versus frequency (or distortion versus frequency) for additional input signal levels, beyond those for which measurements were made. This step provides better resolution of the data, without the need for additional (time-consuming) measurements. FIG. 5 illustrates an example of the interpolated curves, where x is frequency in Hz, y is excursion in millimeters, and z is input level, in volts.

Figure 6:
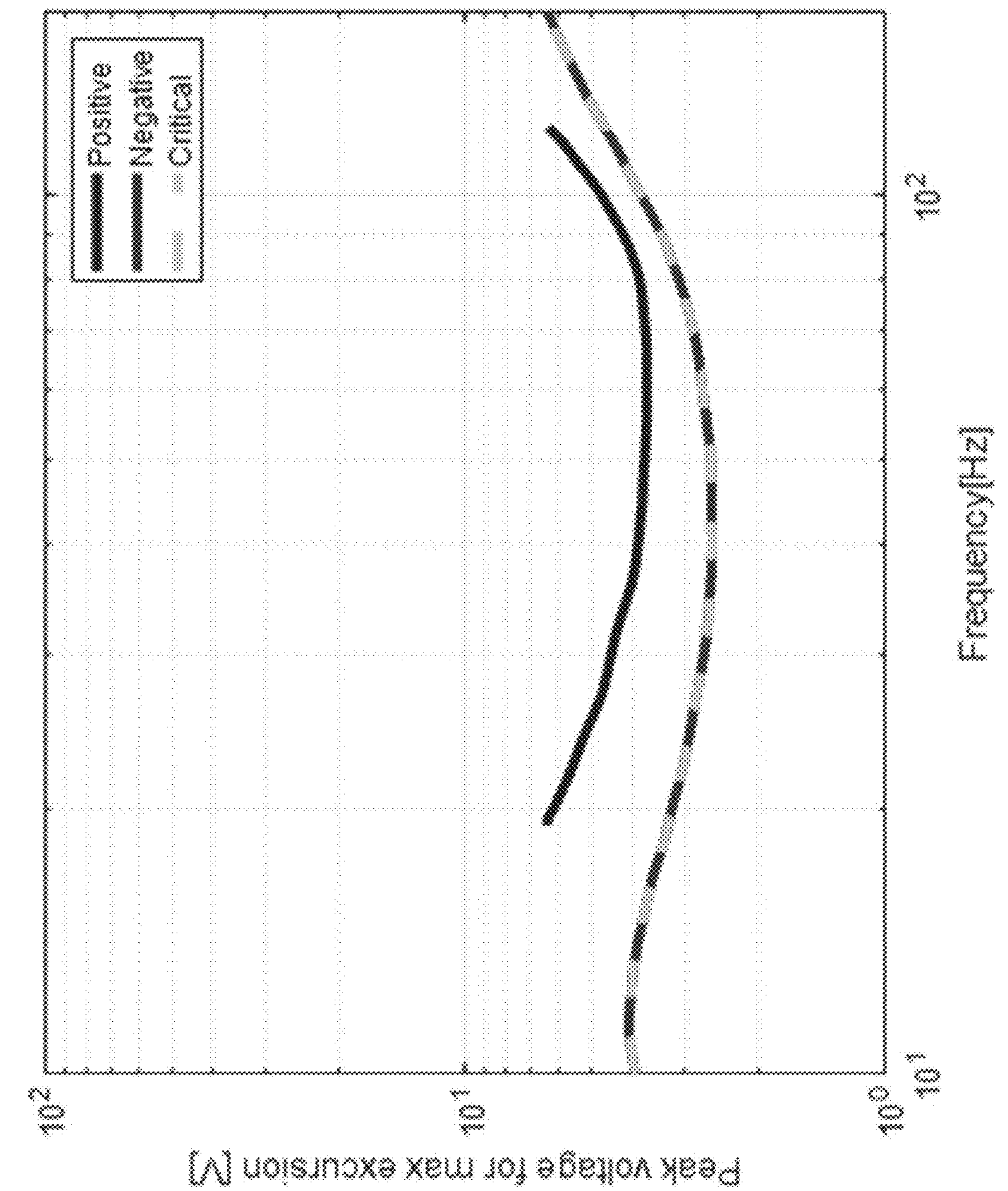
FIG. 6 shows an example of maximum input signal voltage versus frequency.

Block 330 of FIG. 3 illustrates the step of determining the maximum allowed input signal level (e.g., input voltage) for a target maximum excursion value (or target maximum distortion value), for each of several frequencies. An example of the maximum input signal voltage versus frequency resulting from this step is shown in FIG. 6. In this figure, the "positive" and negative curves indicate the maximum allowed displacement relative to the measuring sensor, e.g., positive when moving away from the sensor, negative when towards the sensor for instance. In this particular instance, the negative excursion case is the one that limits the design, since it has the lower magnitude, and thus this is considered to be the "critical" curve, that dictates the circumstances under which attenuation of the input signal is needed. In other loudspeaker implementations, it could be the other way around, such that the positive curve is the limiting factor around which the design has to be done.

Note that the target maximum excursion value used here may be a distance that is derived from the physical dimensions of the speaker structure. An appropriate margin may be implemented in the selection of the target maximum excursion value, in some implementations. In others, design margin might be instead (or additionally) implemented later in the design process, or in the circuitry implementing the attenuation.

Figure 7:
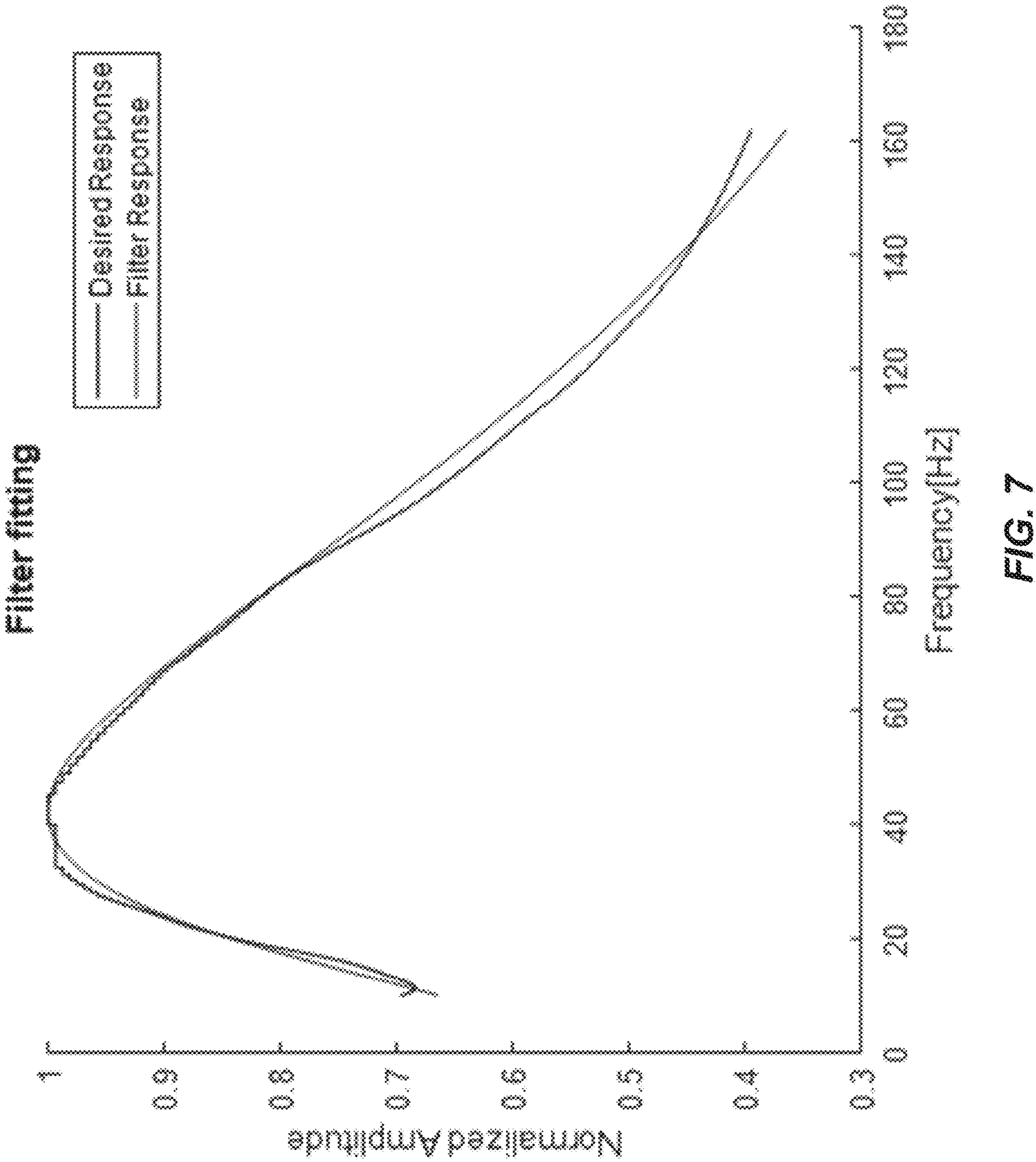
FIG. 7 illustrates an example of an excursion estimator transfer function.
Figure 8:
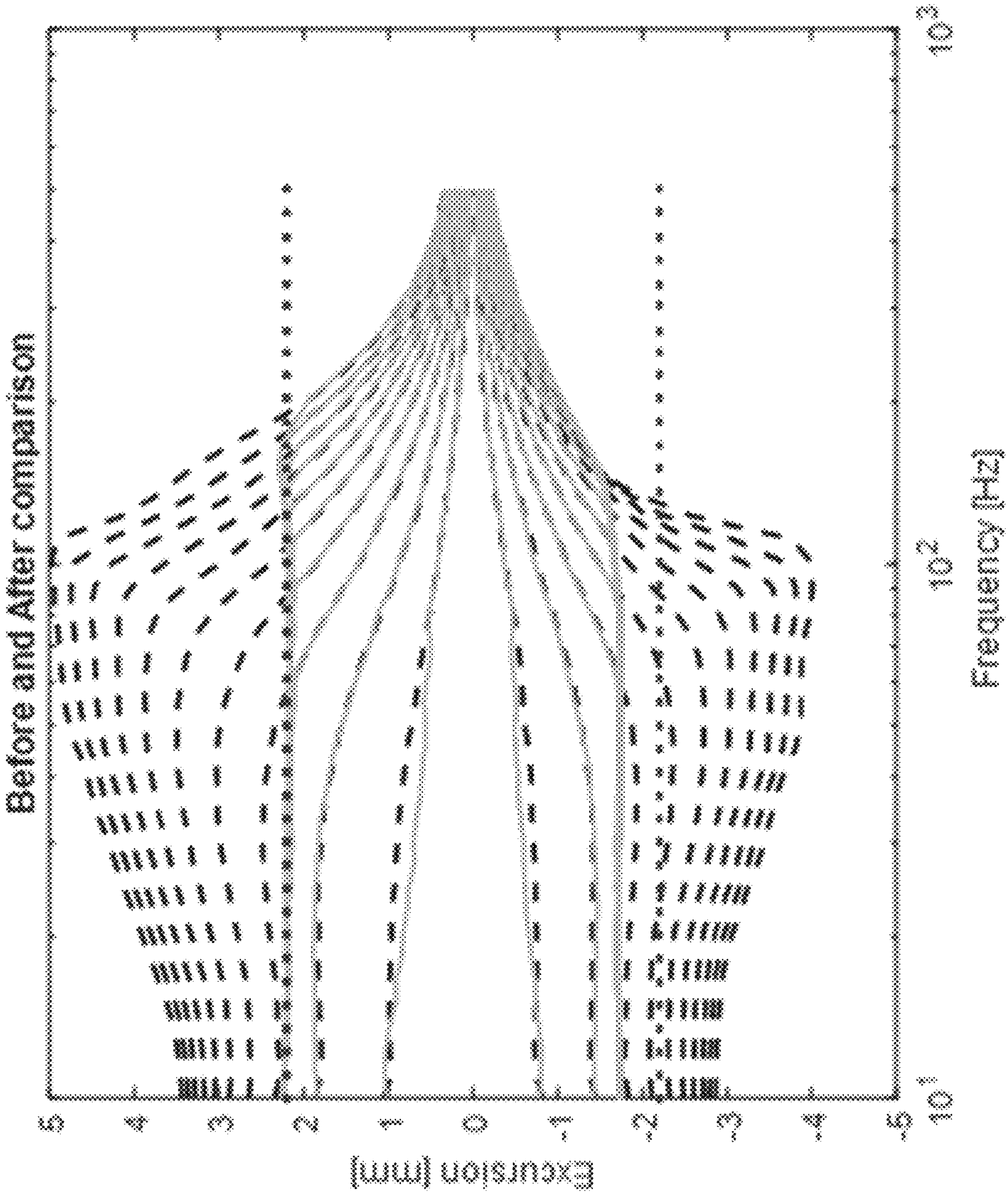
FIG. 8 shows the result of applying an example excursion transfer function in a limiting circuit.

The curve of maximum allowed input signal level versus frequency can then be used to determine an estimator filter function, as shown at block 340 of FIG. 3. This can be done in a straightforward manner by simply inverting the input signal levels (e.g., 1/Vin_max) at each frequency, and then fitting a second-order or third-order filter to resulting graph. The input signal is applied to this filter transfer function, e.g., in an excursion estimator 210 like that shown in FIG. 2—the output is a representation of the speaker excursion (or other excursion-related parameter). This output can be compared to a threshold (e.g., as shown at block 220 of FIG. 2) and used to determine the attenuation that should be applied to the input signal (e.g., using the "attenuation" block in FIG. 2) at any instant in time. FIG. 7 illustrates an example of an excursion estimator transfer function obtained from bench measurements as described above, while FIG. 8 shows the result of applying this excursion estimator transfer function in a limiting circuit, where the threshold used to activate the limiting is set to 2.2 millimeters.

Figure 9:
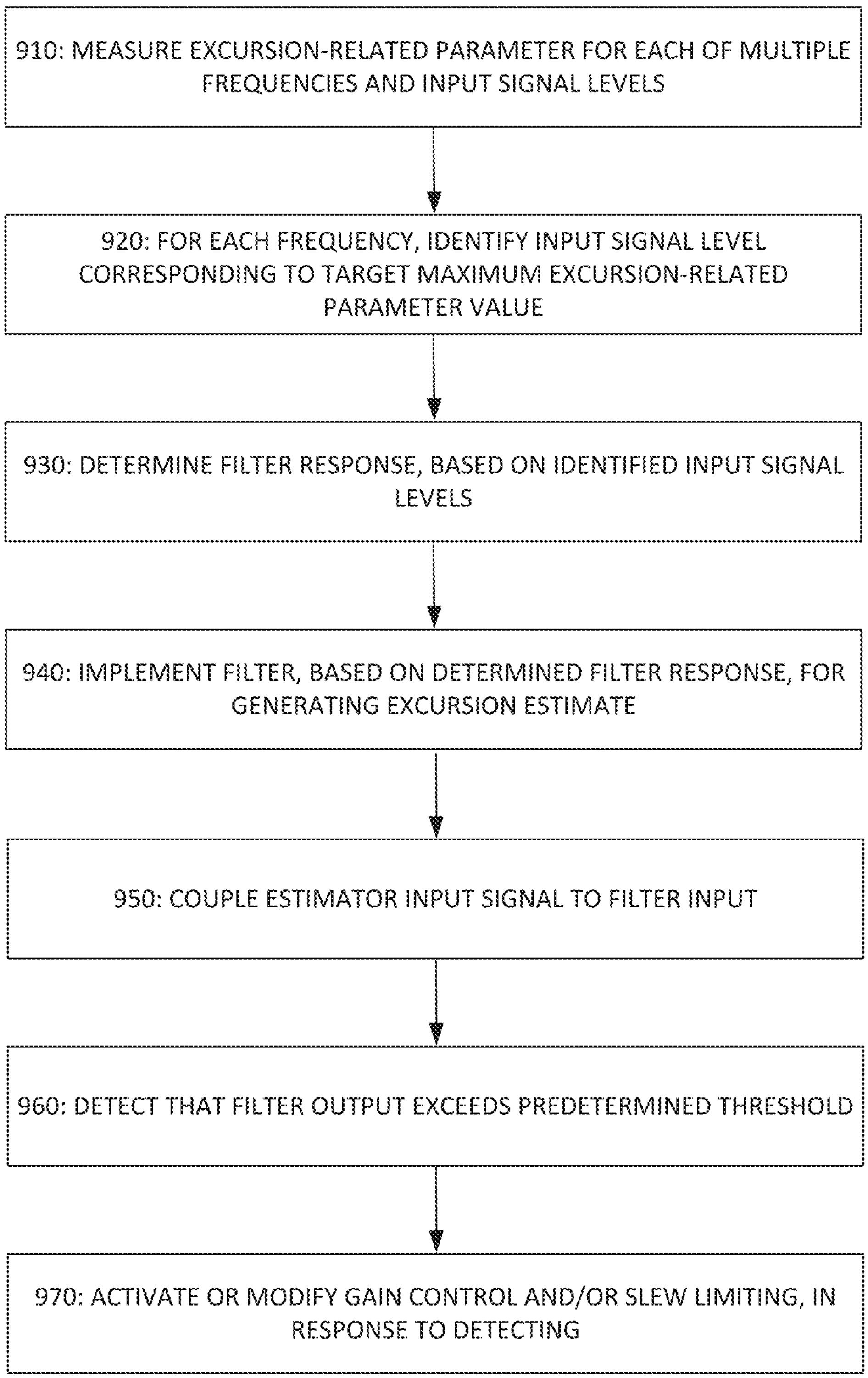
FIG. 9 is a process flow diagram illustrating an example method for designing a loudspeaker excursion estimator.

FIG. 9 is another process flow diagram illustrating an example method for designing a loudspeaker excursion estimator. This method may be considered a generalization of the example technique described above, and is intended to encompass the method shown in FIG. 3, along with several variations of that method.

As shown at block 910, the method of FIG. 9 begins with measuring an excursion-related parameter for a loudspeaker, for each of a plurality of loudspeaker input signal levels and each of a plurality of loudspeaker input signal frequencies. (This step corresponds to the step shown in block 310 of FIG. 3.) It will be appreciated that this can be carried out in several ways. For instance, an input signal level can be set, and the excursion-related parameter then measured for each of a set of frequencies. Then, the loudspeaker input signal level can be adjusted to another value, and the excursion-related parameter can again be measured for each frequency in the set of frequencies. This can be repeated for each value in a set of loudspeaker input signal levels. Equivalently, a particular frequency can be chosen and the excursion-related parameter measured for each of a set of loudspeaker input signal levels. The frequency can then be adjusted to another frequency in the set of frequencies, and the excursion-related parameter again measured for each value in the set of input signal levels, and so on, until the excursion-related parameter is measured for all frequencies in the set and all input signal levels in the set.

The set of frequencies and the set of input signal levels can be selected to span all or just a portion of the audio frequency range and the range of expected loudspeaker input signal levels provided by the audio amplifier driving the speaker. The number of frequencies and the number of input signal levels in the sets should be selected to keep measurement times reasonable. Larger numbers of measurements will result in increased accuracy of the estimator filter response. An implementation might use 40 frequencies and 10 amplitude levels, for example, but the actual number used for any given implementation may vary, depending on the loudspeaker design, the desired precision of the resulting excursion estimation, and/or other factors.

As discussed above, the measured excursion-related parameter may be the actual speaker (diaphragm) excursion, i.e., the movement of the diaphragm in a direction normal to a primary plane of the loudspeaker, in some implementations. In others, an audio distortion level output by the speaker or other proxy for speaker excursion may be measured.

As shown at block 920 of FIG. 9, the next step of the illustrated method is to identify, for each of the plurality of loudspeaker input signal frequencies, a respective loudspeaker input signal level corresponding to the loudspeaker input signal frequency and corresponding to a target maximum excursion-related parameter value. (This step corresponds to the step shown at block 330 of FIG. 3.) This is done based on the measured excursion-related parameters. It will be appreciated that this can be done by selecting a loudspeaker input signal frequency and scanning the measured excursion-related values for each of the loudspeaker input signal levels, to determine the input signal level above which the measured excursion-related first exceeds the target maximum excursion-related parameter value.

Note that in some embodiments, the resolution of this identifying step can be improved by interpolating curves (sequences) of excursion-related parameter values versus frequency, for each of one or more loudspeaker input signal levels falling in between input signal levels at which measurements were made. (This step is shown at block 320 of FIG. 3.) Alternatively, curves (sequences) of excursion-related parameter values versus loudspeaker input levels can be interpolated, for each of one or more frequencies falling in between input signal levels at which measurements were made. By utilizing these interpolated values along with the measured values when identifying the loudspeaker input signal levels that correspond to the target maximum excursion-related parameter value, for each frequency, the resolution of the resulting maximum loudspeaker input signal levels can be improved.

In addition, manufacturing and aging tolerances can be accounted for in this identifying step, in some implementations, by basing the identifying of the loudspeaker input signal corresponding to the targeted maximum excursion-related parameter value on an estimate of variations in excursion-related parameter value versus loudspeaker input signal level due to manufacturing tolerances or component aging, or both, in addition to the measured excursion-related parameters themselves. The variation in speaker parameters caused by manufacturing tolerances/aging can lead to variation in allowed input signal level vs frequency curves for a target maximum excursion. The techniques described herein facilitate converting the spread of multiple parameters into an easy-to-understand variation of allowed input voltage level at each frequency. In other words, the spread in speaker parameters can be translated into spread in allowed input signal levels versus frequency, using simulation models or measurements performed on “corner lot” samples. A worst-case scenario can then be used as a conservative approach to identifying the maximum loudspeaker input signal levels at each frequency.

Thus, in some implementations of the techniques described herein, identifying the respective loudspeaker input signal level for each of the plurality of loudspeaker input signal frequencies may comprise selecting a respective loudspeaker input signal level corresponding to a worst-case excursion-related parameter value, based on the estimate of variations in excursion-related parameter value versus loudspeaker input signal level due to manufacturing tolerances or component aging, or both. In others, the identifying of the respective loudspeaker input signal levels may be carried out to target a certain probability, e.g., 99%, that the actual values of the excursion-related parameters remain within the target maximum, given manufacturing tolerances and/or component aging. Requirements for a lifetime of the product may be taken into account.

In some embodiments, the target maximum excursion-related parameter value may be based on one or more dimensions of a housing, or cabinet, enclosing the loudspeaker. A target maximum excursion may be selected to avoid the speaker diaphragm from striking any part of the housing, for example. In other implementations, a target maximum distortion level may be chosen, or some other target maximum excursion-related parameter indicative of a good user listening experience may be selected.

As shown at block 930 of FIG. 9, a next step is determining a filter response, based on the identified loudspeaker input signal levels and their respective loudspeaker input signal frequencies. (This step corresponds to block 340 of FIG. 3.) This may comprise, for example, fitting a 2nd-order or 3rd-order filter response to a graph of amplitude values versus loudspeaker input signal frequencies, the amplitude values being inversely proportional to the identified loudspeaker input signal levels. A higher-order filter response may certainly be used, but may simply add unnecessary complexity. Simple observation of a fitted third-order filter overlaid on the graph of the amplitude values may indicate whether a higher order filter response is needed.

As shown at block 940, the method further comprises the step of implementing a filter, based on the determined filter response, for generating an excursion estimation based on loudspeaker input signal levels. This may be done in the analog domain, by implementing an analog filter to which an estimator input signal level coupled from the audio signal path for the loudspeaker is applied, or in the digital domain, for application to a digital representation of the input signal for the loudspeaker.

The output of this filter is an estimate of the excursion-related parameter value, based on the input signal level for the loudspeaker at any given time. This estimate can be used to trigger limiting, e.g., in the form of gain control or slew limiting, to prevent excessive excursion of the loudspeaker. An example approach is shown in blocks 950-970 of FIG. 9. As seen in block 950, an estimator input signal obtained from an audio signal path coupled to the loudspeaker is coupled to an input of the filter. As noted above, this can be done in the analog or digital domains, in various implementations. As shown at block 960, the method comprises detecting that an output signal from the filter exceeds a predetermined threshold. Finally, as shown at block 970, gain control and/or slew limiting is activated or modified, in an audio signal path coupled to the loudspeaker, in response to the output signal from the filter exceeding the predetermined threshold.

The predetermined threshold is selected to prevent excessive excursion. In some implementations, the predetermined threshold can be derived based on a maximum point in the filter response curve, taking into consideration the gain of the audio signal path following the point from which the estimator input signal is coupled, including the amplifier, as well as the filter gain.

The discussion of FIG. 9 above assumes that the excursion estimation process is carried out for the entire audio frequency range at once. However, the same or a similar technique might be carried out several times for each of several sub-bands, in some implementations, such as for a bass, midrange, and treble frequency range, whether for a single loudspeaker or for separate loudspeakers for each of the frequency sub-bands. Correspondingly, the gain control/slew limiting may be carried out separately for each of one or more sub-bands, e.g., where the excursion estimates for each sub-band are obtained using filter responses obtained separately for each sub-band, using the techniques described herein.

The method illustrated in FIG. 9 is suitable for implementation at design time, to obtain a filter response appropriate for a particular loudspeaker design, or at manufacturing time, to obtain a filter response specific to a given loudspeaker or suitable for a given lot of loudspeaker units. The loudspeakers may be implemented with a programmable filter response, in some implementations, such that the techniques described herein can be performed after the time of manufacture, e.g., at installation time, to ensure that the excursion estimation reflects the particular speaker build and installation.

Figure 10:
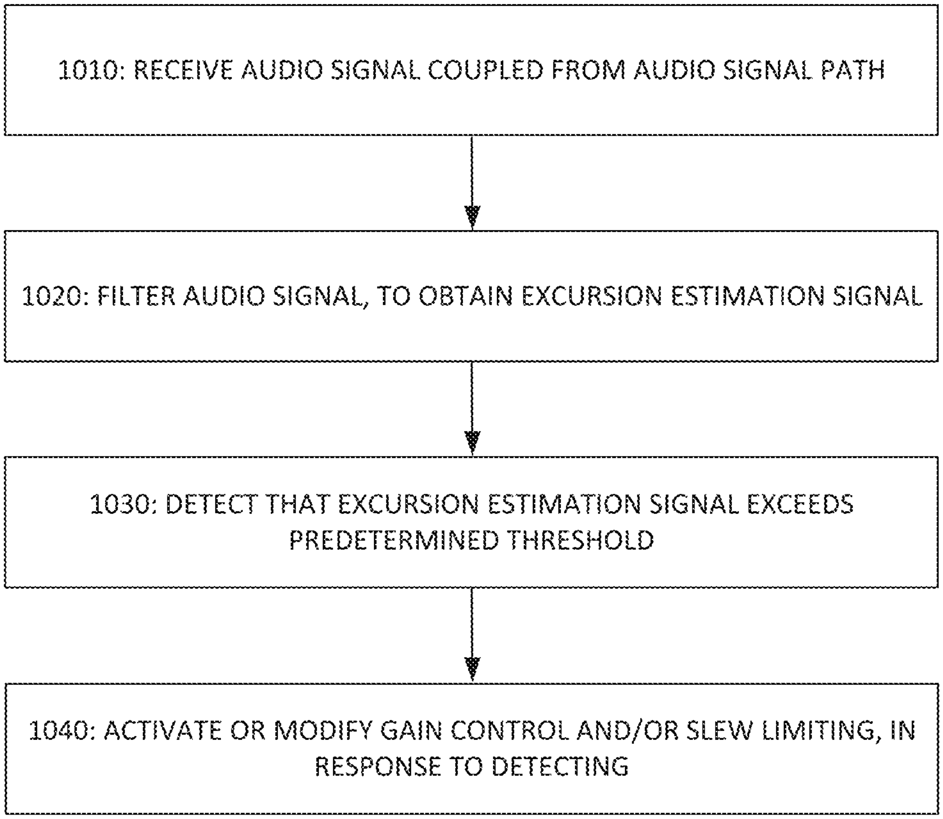
FIG. 10 illustrates an example method from the perspective of a loudspeaker system.

FIG. 10 illustrates an example method from the perspective of a loudspeaker system itself. As shown at block 1010, this method comprises receiving an audio signal coupled from an audio signal path coupled to a loudspeaker. As shown at block 1020, the audio signal is filtered, using an excursion estimation filter, to obtain an excursion estimation signal. As shown at blocks 1030 and 1040, the method comprises detecting that the excursion estimation signal exceeds a predetermined threshold, and activating or modifying gain control or slew limiting in the audio signal path coupled to the loudspeaker, in response to this detecting.

In some implementations, the excursion estimation filter has a second- or third-order filter response fitted to a curve of amplitude values versus loudspeaker input frequencies, the amplitude values being inversely proportional to estimates of speaker input signal levels corresponding to a target maximum speaker excursion or a target maximum audio distortion level. In some of these embodiments, the estimates of the speaker input signal levels are obtained based on measurements of speaker excursion or audio distortion for the loudspeaker, for each of a plurality of loudspeaker input signal levels and each of a plurality of loudspeaker input signal frequencies.

Figure 11:
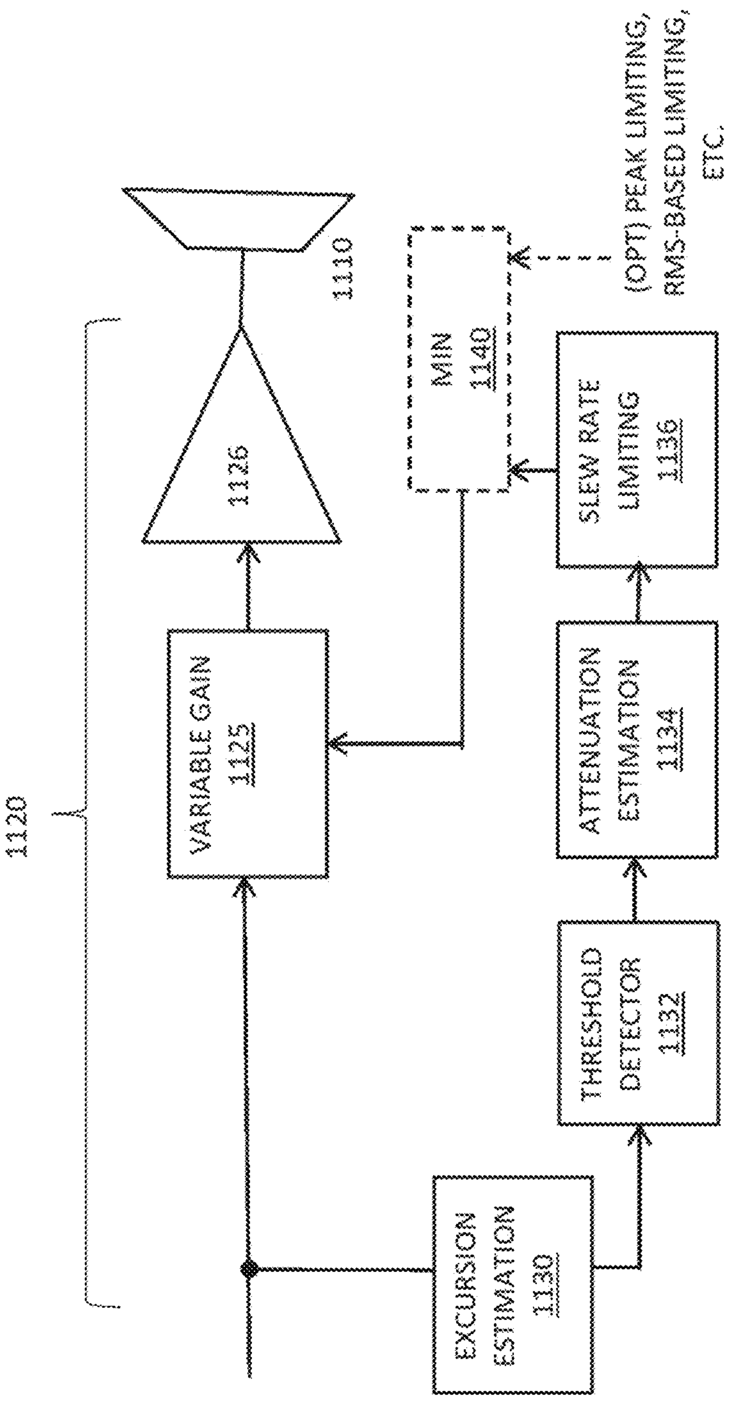
FIG. 11 is a block diagram illustrating an example loudspeaker system.

FIG. 11 is a block diagram illustrating an example loudspeaker system 1100, according to various embodiments of the techniques described herein. Loudspeaker system 1100 comprises a loudspeaker 1110, having an electrical input, and an audio signal path 1120 coupled to the electrical input, the audio signal path comprising variable gain block 1125 and a power amplifier 1126. The loudspeaker system 1100 further comprises excursion estimation filter circuitry 1130 having an input coupled to the audio signal path 1120 and detector circuitry 1140 coupled to an output of the excursion estimation filter circuitry 1130 and configured to detect that an output signal of the excursion estimation filter circuitry 1130 exceeds a predetermined threshold. Responsive to detecting that the excursion exceeds the threshold, control circuitry comprising attenuation estimation circuitry 1134 and, optionally, slew rate limiting circuitry 1136, determines how much attenuation should be applied to the audio signal, via variable gain block 1125. In some embodiments, for instance, the attenuation estimation circuitry 1134 might output an analog signal for controlling variable gain block 1125. To avoid distortion caused by too rapid changes in the amplification, slew rate limiting circuitry 1136 might round off the corners of this analog control signal, in some embodiments, e.g., by applying a smoothing filter to the control signal output by attenuation estimation circuit 1134. It will be appreciated, of course, that digital implementations of all or parts of these and of all or parts of several others of the illustrated blocks are possible. In some embodiments, the attenuation ultimately applied to the audio signal via variable gain block 1125 is determined by minimization (MIN) block 1140, which evaluates the attenuation demands from the illustrated excursion estimation signal path along with input from a peak limiting path, an RMS-based limiting path, and/or the like.

All or parts of excursion estimation filter circuitry 1130, detector circuitry 1132, attenuation estimation circuitry 1134, slew rate limiting circuitry 1136, minimization circuitry 1140, and variable gain block 1125 may be implemented using analog circuits or digital circuits, including digital signal processing circuits. Digital circuits for implementing portions of loudspeaker system 1100 may include one or more memory chips, controller, central processing units, microchips, integrated circuits, application-specific integrated circuits (ASICs), field-programmable gate arrays (FPGAs), and the like.

In some embodiments of the loudspeaker system 1100, the excursion estimation filter circuitry 1130 may have a second- or third-order filter response fitted to a curve of amplitude values versus loudspeaker input values, the amplitude values being inversely proportional to estimates of speaker input signal levels corresponding to a target maximum speaker excursion or a target maximum audio distortion level. In some embodiments, the estimates of the speaker input signal levels may be obtained based on measurements of speaker excursion or audio distortion for the loudspeaker, for each of a plurality of loudspeaker input signal levels and each of a plurality of loudspeaker input signal frequencies. The predetermined threshold may be based on a maximum point in a response of the excursion estimation filter, in some embodiments.

References herein to "embodiments" or "some embodiments" are mean to indicate that the embodiment(s) so described may include particular features, structures, or characteristics, but not every embodiment or implementation necessarily includes the particular features, structures, or characteristics. Some embodiments may have some, all, or none of the features described for other embodiments.

The term "coupled," as used herein, is intended to indicate that two or more elements are connected in operation with one another, but there may or may not be intervening physical or electrical components between them.

It will be appreciated that advantages of the various techniques, circuits, and systems described herein include ease of use. Other model-based methods require extensive modeling and significant knowledge of the loudspeaker to successfully implement a limiting algorithm. The techniques described are simple to use with only limited understanding of the loudspeaker necessary. This enables a faster time to market.

The techniques also require only a low computational load. A typical model-based approach will need to include multiple bi-quads (2nd order filters) to mimic a loudspeaker model, which leads to the computation of many unnecessary intermediate variables. The techniques described herein do not mimic the loudspeaker and thus require a much lower computational load to achieve excursion limiting.

The techniques described herein also address loudspeaker non-linearity. A loudspeaker is a non-linear load, and these non-linearities are difficult to incorporate in model-based approach while restricting the computational load. The measurement-based techniques described herein inherently incorporate the loudspeaker non-linearities without increasing the computational load.

Extension of the basic techniques described herein is possible to include other difficult to model phenomenon, as the measurement-based nature of the techniques enables extension of this approach to include other stressful/extreme operating points, such as different elevation and operating temperature which are difficult to model. It is also possible to include parameter variations, e.g., resulting from aging and/or manufacturing tolerances, into the design procedure.

What is claimed is:

1. A method for designing a loudspeaker excursion estimator, comprising:

measuring an excursion-related parameter for a loudspeaker, for each of a plurality of loudspeaker input signal levels and each of a plurality of loudspeaker input signal frequencies;

for each of the plurality of loudspeaker input signal frequencies and based on the measured excursion-related parameters, identifying a respective loudspeaker input signal level corresponding to the loudspeaker input signal frequency and corresponding to a target maximum excursion-related parameter value;

determining a filter response, based on the identified loudspeaker input signal levels and their respective loudspeaker input signal frequencies; and implementing a filter, based on the determined filter response, for generating an excursion estimate based on loudspeaker input signal levels.

2. The method of claim 1, wherein the excursion-related parameter is speaker excursion, in a direction normal to a primary plane of the loudspeaker.

3. The method of claim 2, wherein the target maximum excursion-related parameter value is based on one or more dimensions of a housing enclosing the loudspeaker.

4. The method of claim 1, wherein the excursion-related parameter is audio distortion from the loudspeaker.

5. The method of claim 1, wherein said identifying the respective loudspeaker input signal level for each of the plurality of loudspeaker input signal frequencies is based on an estimate of variations in excursion-related parameter value versus loudspeaker input signal level due to manufacturing tolerances or component aging, or both.

6. The method of claim 5, wherein said identifying the respective loudspeaker input signal level for each of the plurality of loudspeaker input signal frequencies comprises selecting a respective loudspeaker input signal level corresponding to a worst-case excursion-related parameter value, based on the estimate of variations in excursion-related parameter value versus loudspeaker input signal level due to manufacturing tolerances or component aging, or both.

7. The method of claim 1, wherein determining the filter response comprises fitting a $2^{nd}$-order or $3^{rd}$-order filter response to a graph of amplitude values versus loudspeaker input signal frequencies, the amplitude values being inversely proportional to the identified loudspeaker input signal levels.

8. The method of claim 1:

wherein measuring the excursion-related parameters comprises measuring the excursion-related parameters at each of the plurality of loudspeaker input signal frequencies, for each of the plurality of loudspeaker input signal levels, to obtain a series of excursion-related parameters versus frequency for each loudspeaker input signal level;

wherein the method further comprises, for at least one loudspeaker input signal level other than the plurality of loudspeaker input signal levels, interpolating a series of excursion-related parameters versus frequency, based on the measured excursion-related parameters; and wherein identifying the respective loudspeaker input signal levels is based further on the interpolated series of excursion-related parameters.

9. The method of claim 1:

wherein measuring the excursion-related parameters comprises measuring the excursion-related parameters at each of the plurality of loudspeaker input signal levels, for each of the plurality of loudspeaker input signal frequencies, to obtain a series of excursion-related parameters versus loudspeaker input signal level, for each loudspeaker input signal frequency;

wherein the method further comprises, for at least one loudspeaker input signal frequency other than the plurality of loudspeaker input signal frequencies, interpolating a series of excursion-related parameters versus loudspeaker input signal level, based on the measured excursion-related parameters; and wherein identifying the respective loudspeaker input signal levels is based further on the interpolated series of excursion-related parameters.

10. The method of claim 1, further comprising:

coupling, to an input of the filter, an estimator input signal from an audio signal path coupled to the loudspeaker;

detecting that an output signal from the filter exceeds a predetermined threshold; and activating or modifying gain control or slew limiting in an audio signal path coupled to the loudspeaker, in response to said detecting.

11. The method of claim 10, wherein the method comprises determining the predetermined threshold based on a maximum point in the filter response.

12. A method, comprising:

receiving an audio signal coupled from an audio signal path coupled to a loudspeaker;

filtering the audio signal using an excursion estimation filter, to obtain an excursion estimation signal;

detecting that the excursion estimation signal exceeds a predetermined threshold; and activating or modifying gain control or slew limiting in the audio signal path coupled to the loudspeaker, in response to said detecting.

13. The method of claim 12, wherein the excursion estimation filter has a second- or third-order filter response fitted to a curve of amplitude values versus loudspeaker input frequencies, the amplitude values being inversely proportional to estimates of speaker input signal levels corresponding to a target maximum speaker excursion or a target maximum audio distortion level.

14. The method of claim 13, wherein the estimates of the speaker input signal levels are obtained based on measurements of speaker excursion or audio distortion for the loudspeaker, for each of a plurality of loudspeaker input signal levels and each of a plurality of loudspeaker input signal frequencies.

15. The method of claim 12, wherein the method comprises determining the predetermined threshold based on a maximum point in a response of the excursion estimation filter.

16. A loudspeaker system, comprising:

a loudspeaker, having an electrical input;

an audio signal path coupled to the electrical input, the audio signal path comprising gain control circuitry or slew limiting circuitry, or both;

excursion estimation filter circuitry having an input coupled to the audio signal path;

detector circuitry coupled to an output of the excursion estimation filter circuitry and configured to detect that an output signal of the excursion estimation filter circuitry exceeds a predetermined threshold; and control circuitry configured to activate or modify performance of the gain control circuitry or slew limiting circuitry or both, in response to an output from the detector circuitry.

17. The loudspeaker system of claim 16, wherein the excursion estimation filter circuitry has a second- or third-order filter response fitted to a curve of amplitude values versus loudspeaker input values, the amplitude values being inversely proportional to estimates of speaker input signal levels corresponding to a target maximum speaker excursion or a target maximum audio distortion level.

18. The loudspeaker system of claim 17, wherein the estimates of the speaker input signal levels are obtained based on measurements of speaker excursion or audio distortion for the loudspeaker, for each of a plurality of loudspeaker input signal levels and each of a plurality of loudspeaker input signal frequencies.

19. The loudspeaker system of claim 16, wherein the predetermined threshold is based on a maximum point in a response of the excursion estimation filter.

* * * * *